(12) United States Patent
Pavlak et al.

(10) Patent No.: US 8,527,096 B2
(45) Date of Patent: Sep. 3, 2013

(54) PROGRAMMABLE CONTROLLER AND A USER INTERFACE FOR SAME

(75) Inventors: Thomas G. Pavlak, Commerce Township, MI (US); Timothy H. Thorson, McKinney, TX (US); Timothy E. Wallaert, Wylie, TX (US)

(73) Assignee: Lennox Industries Inc., Richardson, TX (US)

( * ) Notice: Subject to any disclaimer, the term of this patent is extended or adjusted under 35 U.S.C. 154(b) by 605 days.

(21) Appl. No.: 12/290,023

(22) Filed: Oct. 24, 2008

(65) Prior Publication Data

US 2010/0106305 A1 Apr. 29, 2010

(51) Int. Cl.
*G01M 1/38* (2006.01)

(52) U.S. Cl.
USPC .......................................... 700/276; 236/1 B

(58) Field of Classification Search
USPC .......................... 700/276–278; 236/1 B–1 C
See application file for complete search history.

(56) References Cited

U.S. PATENT DOCUMENTS

| | | | |
|---|---|---|---|
| 4,048,491 A | 9/1977 | Wessman | |
| 4,187,543 A | 2/1980 | Healey et al. | |
| 4,262,736 A | 4/1981 | Gilkeson et al. | |
| 4,381,549 A | 4/1983 | Stamp et al. | |
| 4,464,543 A | 8/1984 | Kline et al. | |
| 4,482,785 A | 11/1984 | Finnegan et al. | |
| 4,606,042 A | 8/1986 | Kahn et al. | |
| 4,616,325 A | 10/1986 | Heckenbach et al. | |
| 4,829,447 A | 5/1989 | Parker et al. | |
| 4,843,084 A | 6/1989 | Parker et al. | |
| 4,884,214 A | 11/1989 | Parker et al. | |
| 4,967,567 A | 11/1990 | Proctor et al. | |
| 5,039,980 A | 8/1991 | Aggers et al. | |
| 5,061,916 A | 10/1991 | French et al. | |
| 5,065,813 A | 11/1991 | Berkeley et al. | |
| 5,086,385 A | 2/1992 | Launey et al. | |
| 5,128,855 A | 7/1992 | Hilber et al. | |
| 5,165,465 A | 11/1992 | Kenet | |
| 5,170,935 A | 12/1992 | Federspiel et al. | |
| 5,259,553 A | 11/1993 | Shyu | |
| 5,274,571 A | 12/1993 | Hessee et al. | |
| 5,278,957 A | 1/1994 | Chan | |
| 5,341,988 A | 8/1994 | Rein et al. | |

(Continued)

FOREIGN PATENT DOCUMENTS

| EP | 0980165 A2 | 2/2000 |
|---|---|---|
| EP | 1956311 A2 | 8/2008 |

(Continued)

OTHER PUBLICATIONS

"Define Track at Dictionary.com," http://dictionary.reference.com/browse/track, Mar. 12, 2013, 3 pages.

(Continued)

*Primary Examiner* — Mohammad Ali
*Assistant Examiner* — Nathan Laughlin

(57) ABSTRACT

A programmable controller includes a user interface which includes a default interface, a home screen, an indoor settings interface and one or more tab interfaces. As the home screen covers a predominant portion of the default interface and is associated with the indoor settings interface, the home screen enables an operator of the programmable thermostat to intuitively transition from the home screen to the indoor settings and one or more tab interfaces.

21 Claims, 3 Drawing Sheets

(56) References Cited

U.S. PATENT DOCUMENTS

| | | |
|---|---|---|
| 5,361,982 A | 11/1994 | Liebi et al. |
| 5,374,200 A | 12/1994 | Giroux |
| 5,384,697 A | 1/1995 | Pascucci |
| 5,434,965 A | 7/1995 | Matheny et al. |
| 5,444,851 A | 8/1995 | Woest |
| 5,450,570 A | 9/1995 | Richek et al. |
| 5,463,735 A | 10/1995 | Pascucci et al. |
| 5,475,364 A | 12/1995 | Kenet |
| 5,481,481 A | 1/1996 | Frey et al. |
| 5,511,188 A | 4/1996 | Pascucci et al. |
| 5,522,044 A | 5/1996 | Pascucci et al. |
| 5,544,036 A | 8/1996 | Brown et al. |
| 5,550,980 A | 8/1996 | Pascucci et al. |
| 5,555,509 A | 9/1996 | Dolan et al. |
| 5,581,478 A | 12/1996 | Cruse et al. |
| 5,598,566 A | 1/1997 | Pascucci et al. |
| 5,613,157 A | 3/1997 | Davidson et al. |
| 5,621,662 A | 4/1997 | Humphries et al. |
| 5,631,825 A | 5/1997 | van Weele et al. |
| 5,675,756 A | 10/1997 | Benton et al. |
| 5,684,463 A | 11/1997 | Diercks et al. |
| 5,706,190 A | 1/1998 | Russ et al. |
| 5,729,442 A | 3/1998 | Frantz |
| 5,751,948 A | 5/1998 | Dolan et al. |
| 5,784,647 A | 7/1998 | Sugimoto |
| 5,793,646 A | 8/1998 | Hibberd et al. |
| 5,801,942 A | 9/1998 | Nixon et al. |
| 5,803,357 A | 9/1998 | Lakin |
| 5,818,347 A | 10/1998 | Dolan et al. |
| 5,822,512 A | 10/1998 | Goodrum et al. |
| 5,862,052 A | 1/1999 | Nixon et al. |
| 5,884,072 A | 3/1999 | Rasmussen |
| 5,924,486 A | 7/1999 | Ehlers et al. |
| 5,937,942 A | 8/1999 | Bias et al. |
| 5,962,989 A | 10/1999 | Baker |
| 5,974,554 A | 10/1999 | Oh |
| 5,983,353 A | 11/1999 | McHann, Jr. |
| 6,052,525 A | 4/2000 | Carlson et al. |
| 6,061,600 A | 5/2000 | Ying |
| 6,115,713 A | 9/2000 | Pascucci et al. |
| 6,141,595 A | 10/2000 | Gloudeman et al. |
| 6,169,964 B1 | 1/2001 | Alsa et al. |
| 6,170,044 B1 | 1/2001 | McLaughlin et al. |
| 6,240,326 B1 | 5/2001 | Gloudeman et al. |
| 6,241,156 B1 | 6/2001 | Kline et al. |
| 6,271,845 B1 | 8/2001 | Richardson |
| 6,307,331 B1 | 10/2001 | Bonasia et al. |
| 6,349,306 B1 | 2/2002 | Malik et al. |
| 6,359,220 B2 | 3/2002 | Schiedegger et al. |
| 6,370,037 B1 | 4/2002 | Schoenfish |
| 6,374,373 B1 | 4/2002 | Helm et al. |
| 6,377,283 B1 | 4/2002 | Thomas |
| 6,411,857 B1 | 6/2002 | Flood |
| 6,427,454 B1 | 8/2002 | West |
| 6,430,953 B2 | 8/2002 | Roh |
| 6,437,805 B1 | 8/2002 | Sojoodi et al. |
| 6,441,723 B1 | 8/2002 | Mansfield et al. |
| 6,453,374 B1 | 9/2002 | Kovalan et al. |
| 6,493,661 B1 | 12/2002 | White et al. |
| 6,501,995 B1 | 12/2002 | Kinney et al. |
| 6,505,087 B1 | 1/2003 | Lucas et al. |
| 6,508,407 B1 | 1/2003 | Lefkowitz et al. |
| 6,545,660 B1 | 4/2003 | Shen et al. |
| 6,552,647 B1 | 4/2003 | Thiessen et al. |
| 6,564,348 B1 | 5/2003 | Barenys et al. |
| 6,594,272 B1 | 7/2003 | Ketcham et al. |
| 6,595,430 B1 | 7/2003 | Shah |
| 6,621,507 B1 | 9/2003 | Shah |
| 6,639,939 B1 | 10/2003 | Naden et al. |
| 6,644,557 B1 | 11/2003 | Jacobs |
| 6,717,919 B1 | 4/2004 | Ketcham et al. |
| 6,747,888 B2 | 6/2004 | Klein |
| 6,774,786 B1 | 8/2004 | Havekost et al. |
| 6,791,530 B2 | 9/2004 | Vernier et al. |
| 6,817,757 B1 | 11/2004 | Wallace |
| 6,824,069 B2 | 11/2004 | Rosen |
| 6,833,787 B1 | 12/2004 | Levi |
| 6,868,292 B2 | 3/2005 | Ficco et al. |
| 6,914,893 B2 | 7/2005 | Petite |
| 6,944,785 B2 | 9/2005 | Gadir et al. |
| 6,967,565 B2 | 11/2005 | Lingemann |
| 7,000,849 B2 | 2/2006 | Ashworth et al. |
| 7,002,462 B2 | 2/2006 | Welch |
| 7,027,808 B2 | 4/2006 | Wesby |
| 7,031,880 B1 | 4/2006 | Seem et al. |
| 7,051,282 B2 | 5/2006 | Marcjan |
| 7,055,759 B2 | 6/2006 | Wacker et al. |
| 7,085,814 B1 | 8/2006 | Gandhi et al. |
| 7,089,530 B1 | 8/2006 | Dardinski et al. |
| 7,092,768 B1 | 8/2006 | Labuda |
| 7,096,465 B1 | 8/2006 | Dardinski et al. |
| 7,114,554 B2 | 10/2006 | Bergman et al. |
| 7,127,327 B1 | 10/2006 | O'Donnell |
| 7,142,948 B2 | 11/2006 | Metz |
| 7,172,160 B2 | 2/2007 | Piel et al. |
| 7,222,111 B1 | 5/2007 | Budke, Jr. |
| 7,225,054 B2 | 5/2007 | Amundson et al. |
| 7,232,058 B2 | 6/2007 | Lee |
| 7,259,666 B1 | 8/2007 | Hermsmeyer et al. |
| 7,274,972 B2 | 9/2007 | Amundson et al. |
| 7,281,697 B2 | 10/2007 | Reggiani |
| 7,302,642 B2 | 11/2007 | Smith et al. |
| 7,306,165 B2 | 12/2007 | Shah |
| 7,313,465 B1 | 12/2007 | O'Donnell |
| 7,318,089 B1 | 1/2008 | Stachura et al. |
| 7,320,110 B2 | 1/2008 | Shah |
| 7,337,191 B2 | 2/2008 | Haeberle et al. |
| 7,343,226 B2 | 3/2008 | Ehlers et al. |
| 7,346,433 B2 | 3/2008 | Budike, Jr. |
| 7,349,761 B1 | 3/2008 | Cruse |
| 7,359,335 B2 | 4/2008 | Knop et al. |
| 7,360,717 B2 | 4/2008 | Shah |
| 7,379,791 B2 | 5/2008 | Tamarkin et al. |
| 7,379,997 B2 | 5/2008 | Ehlers et al. |
| 7,418,428 B2 | 8/2008 | Ehlers et al. |
| 7,424,345 B2 | 9/2008 | Norbeck |
| 7,434,744 B2 | 10/2008 | Garozzo et al. |
| 7,439,862 B2 | 10/2008 | Quan |
| 7,446,660 B2 | 11/2008 | Posamentier |
| 7,448,435 B2 | 11/2008 | Garozzo |
| 7,457,853 B1 | 11/2008 | Chari et al. |
| 7,460,933 B2 | 12/2008 | Chapman, Jr. et al. |
| 7,476,988 B2 | 1/2009 | Mulhouse et al. |
| 7,516,106 B2 | 4/2009 | Ehlers et al. |
| 7,526,364 B2 | 4/2009 | Rule et al. |
| 7,567,844 B2 | 7/2009 | Thomas et al. |
| 7,571,195 B2 | 8/2009 | Billingsley et al. |
| 7,571,355 B2 | 8/2009 | Shabalin |
| 7,574,871 B2 | 8/2009 | Bloemer et al. |
| 7,584,897 B2 | 9/2009 | Schultz et al. |
| 7,587,459 B2 | 9/2009 | Wewalaarachchi |
| 7,593,124 B1 | 9/2009 | Sheng et al. |
| 7,593,787 B2 | 9/2009 | Feingold et al. |
| 7,604,046 B2 | 10/2009 | Bergman et al. |
| 7,624,931 B2 | 12/2009 | Chapman et al. |
| 7,641,126 B2 | 1/2010 | Schultz et al. |
| 7,650,323 B2 | 1/2010 | Hesse et al. |
| D610,475 S | 2/2010 | Beers et al. |
| 7,693,583 B2 | 4/2010 | Wolff et al. |
| 7,693,591 B2 | 4/2010 | Hoglund et al. |
| 7,706,923 B2 | 4/2010 | Amundson et al. |
| 7,730,223 B1 | 6/2010 | Bavor et al. |
| 7,734,572 B2 | 6/2010 | Wiemeyer et al. |
| 7,743,124 B2 | 6/2010 | Holdaway et al. |
| 7,747,757 B2 | 6/2010 | Garglulo et al. |
| 7,752,289 B2 | 7/2010 | Kikkawa et al. |
| 7,761,563 B2 | 7/2010 | Shike et al. |
| 7,774,102 B2 | 8/2010 | Butler et al. |
| 7,797,349 B2 | 9/2010 | Kosaka |
| 7,809,472 B1 | 10/2010 | Silva et al. |
| 7,827,963 B2 | 11/2010 | Li et al. |
| 7,847,790 B2 | 12/2010 | Bewley et al. |
| 7,861,941 B2 | 1/2011 | Schultz et al. |
| 7,870,080 B2 | 1/2011 | Budike, Jr. |

| | | |
|---|---|---|
| 7,886,166 B2 | 2/2011 | Shnekendorf et al. |
| 7,904,209 B2 | 3/2011 | Podgorny et al. |
| 7,934,504 B2 | 5/2011 | Lowe et al. |
| 7,949,615 B2 | 5/2011 | Ehlers et al. |
| 7,963,454 B2 | 6/2011 | Sullivan et al. |
| D642,081 S | 7/2011 | Kashimoto |
| 7,979,164 B2 | 7/2011 | Garozzo et al. |
| 8,005,576 B2 | 8/2011 | Rodgers |
| 8,024,054 B2 | 9/2011 | Mairs et al. |
| 8,032,254 B2 | 10/2011 | Amundson et al. |
| 8,042,049 B2 | 10/2011 | Killian et al. |
| D648,641 S | 11/2011 | Wallaert |
| D648,642 S | 11/2011 | Wallaert |
| 8,050,801 B2 | 11/2011 | Richards et al. |
| 8,082,068 B2 | 12/2011 | Rodgers |
| 8,083,154 B2 | 12/2011 | Schultz et al. |
| 8,087,593 B2 | 1/2012 | Leen |
| 8,091,796 B2 | 1/2012 | Amundson et al. |
| 8,099,178 B2 | 1/2012 | Mairs et al. |
| 8,103,390 B2 | 1/2012 | Rodgers |
| 8,112,181 B2 | 2/2012 | Remsburg |
| 8,116,917 B2 | 2/2012 | Rodgers |
| 8,122,110 B1 | 2/2012 | Wilbur et al. |
| 8,127,060 B2 | 2/2012 | Doll et al. |
| 8,167,216 B2 | 5/2012 | Schultz et al. |
| 8,183,995 B2 | 5/2012 | Wang et al. |
| 8,219,249 B2 | 7/2012 | Harrod et al. |
| 8,224,491 B2 | 7/2012 | Koster et al. |
| 8,239,066 B2 | 8/2012 | Jennings et al. |
| 8,239,073 B2 | 8/2012 | Fausak et al. |
| 8,244,383 B2 | 8/2012 | Bergman et al. |
| 8,255,090 B2 | 8/2012 | Frader-Thompson |
| 2001/0025349 A1 | 9/2001 | Sharood et al. |
| 2001/0055311 A1 | 12/2001 | Trachewsky et al. |
| 2002/0002425 A1 | 1/2002 | Dossey et al. |
| 2002/0013897 A1 | 1/2002 | McTernan et al. |
| 2002/0016639 A1 | 2/2002 | Smith et al. |
| 2002/0033252 A1 | 3/2002 | Sasao et al. |
| 2002/0048194 A1 | 4/2002 | Klein |
| 2002/0104323 A1 | 8/2002 | Rash et al. |
| 2002/0116550 A1 | 8/2002 | Hansen |
| 2002/0124211 A1 | 9/2002 | Gray et al. |
| 2002/0143523 A1 | 10/2002 | Balaji et al. |
| 2002/0152298 A1 | 10/2002 | Kikta et al. |
| 2002/0157054 A1 | 10/2002 | Shin et al. |
| 2002/0178288 A1 | 11/2002 | McLeod |
| 2002/0191026 A1 | 12/2002 | Rodden et al. |
| 2002/0191603 A1 | 12/2002 | Shin et al. |
| 2003/0061340 A1 | 3/2003 | Sun et al. |
| 2003/0088338 A1 | 5/2003 | Phillips et al. |
| 2003/0097482 A1 | 5/2003 | DeHart et al. |
| 2003/0116637 A1 | 6/2003 | Ellingham |
| 2003/0154355 A1 | 8/2003 | Fernandez |
| 2003/0191857 A1 | 10/2003 | Terrell et al. |
| 2003/0206100 A1 | 11/2003 | Richman et al. |
| 2004/0001478 A1 | 1/2004 | Wong |
| 2004/0003051 A1 | 1/2004 | Kryzanowski et al. |
| 2004/0003415 A1 | 1/2004 | Ng |
| 2004/0025089 A1 | 2/2004 | Haswarey et al. |
| 2004/0059815 A1 | 3/2004 | Buckingham et al. |
| 2004/0066788 A1 | 4/2004 | Lin et al. |
| 2004/0088069 A1 | 5/2004 | Singh |
| 2004/0111254 A1 | 6/2004 | Gogel et al. |
| 2004/0133314 A1 | 7/2004 | Ehlers et al. |
| 2004/0133704 A1 | 7/2004 | Kryzyanowski |
| 2004/0138981 A1 | 7/2004 | Ehlers et al. |
| 2004/0148482 A1 | 7/2004 | Grundy et al. |
| 2004/0222307 A1 | 11/2004 | DeLuca |
| 2004/0245352 A1 | 12/2004 | Smith et al. |
| 2004/0260427 A1* | 12/2004 | Wimsatt ................ 700/275 |
| 2004/0267385 A1 | 12/2004 | Lingemann |
| 2004/0267395 A1 | 12/2004 | Discenzo et al. |
| 2005/0040247 A1 | 2/2005 | Pouchak |
| 2005/0040250 A1 | 2/2005 | Wruck |
| 2005/0041033 A1 | 2/2005 | Hilts et al. |
| 2005/0046584 A1 | 3/2005 | Breed |
| 2005/0051168 A1 | 3/2005 | DeVries et al. |
| 2005/0073789 A1 | 4/2005 | Tanis |
| 2005/0090915 A1 | 4/2005 | Gelwitz |
| 2005/0097478 A1 | 5/2005 | Killian et al. |
| 2005/0103874 A1 | 5/2005 | Erdman |
| 2005/0116023 A1 | 6/2005 | Amundson et al. |
| 2005/0119765 A1 | 6/2005 | Bergman |
| 2005/0119766 A1 | 6/2005 | Amundson et al. |
| 2005/0119771 A1 | 6/2005 | Amundson et al. |
| 2005/0119793 A1 | 6/2005 | Amundson et al. |
| 2005/0119794 A1 | 6/2005 | Amundson et al. |
| 2005/0154494 A1 | 7/2005 | Ahmed |
| 2005/0159848 A1 | 7/2005 | Shah et al. |
| 2005/0159924 A1 | 7/2005 | Shah et al. |
| 2005/0182498 A1 | 8/2005 | Landou et al. |
| 2005/0192727 A1 | 9/2005 | Shostak et al. |
| 2005/0198040 A1 | 9/2005 | Cohen et al. |
| 2005/0240312 A1 | 10/2005 | Terry et al. |
| 2005/0252673 A1 | 11/2005 | Kregle et al. |
| 2005/0256591 A1 | 11/2005 | Rule et al. |
| 2005/0256935 A1 | 11/2005 | Overstreet et al. |
| 2005/0258259 A1 | 11/2005 | Stanimirovic |
| 2006/0009861 A1 | 1/2006 | Bonasla et al. |
| 2006/0009863 A1 | 1/2006 | Lingemann |
| 2006/0027671 A1 | 2/2006 | Shah |
| 2006/0036350 A1 | 2/2006 | Bohrer et al. |
| 2006/0036952 A1 | 2/2006 | Yang |
| 2006/0045107 A1 | 3/2006 | Kucenas et al. |
| 2006/0048064 A1 | 3/2006 | Vronay |
| 2006/0063523 A1 | 3/2006 | McFarland et al. |
| 2006/0105697 A1 | 5/2006 | Aronstam et al. |
| 2006/0159007 A1 | 7/2006 | Frutiger et al. |
| 2006/0185818 A1 | 8/2006 | Garozzo |
| 2006/0192021 A1 | 8/2006 | Schultz et al. |
| 2006/0192022 A1 | 8/2006 | Barton et al. |
| 2006/0206220 A1 | 9/2006 | Amundson |
| 2006/0212194 A1 | 9/2006 | Breed |
| 2006/0219799 A1 | 10/2006 | Schultz et al. |
| 2006/0235548 A1 | 10/2006 | Gaudette |
| 2006/0250578 A1 | 11/2006 | Pohl et al. |
| 2006/0250979 A1 | 11/2006 | Gauweller et al. |
| 2006/0267756 A1 | 11/2006 | Kates |
| 2007/0008116 A1 | 1/2007 | Bergman et al. |
| 2007/0016311 A1 | 1/2007 | Bergman et al. |
| 2007/0019683 A1 | 1/2007 | Kryzyanowski |
| 2007/0035255 A1 | 2/2007 | Shuster et al. |
| 2007/0043477 A1 | 2/2007 | Ehlers et al. |
| 2007/0053513 A1 | 3/2007 | Hoffberg |
| 2007/0055757 A1 | 3/2007 | Mairs et al. |
| 2007/0067062 A1 | 3/2007 | Mairs et al. |
| 2007/0097993 A1 | 5/2007 | Bojahra et al. |
| 2007/0109114 A1 | 5/2007 | Farley et al. |
| 2007/0114291 A1 | 5/2007 | Pouchak |
| 2007/0131784 A1 | 6/2007 | Garozzo et al. |
| 2007/0157016 A1 | 7/2007 | Dayan et al. |
| 2007/0194138 A9 | 8/2007 | Shah |
| 2007/0205916 A1 | 9/2007 | Blom et al. |
| 2007/0219645 A1 | 9/2007 | Thomas et al. |
| 2007/0220301 A1 | 9/2007 | Brundridge et al. |
| 2007/0220907 A1 | 9/2007 | Ehlers |
| 2007/0221741 A1 | 9/2007 | Wagner et al. |
| 2007/0233323 A1 | 10/2007 | Wiemeyer et al. |
| 2007/0236156 A1 | 10/2007 | Lys et al. |
| 2007/0241203 A1 | 10/2007 | Wagner et al. |
| 2007/0257120 A1 | 11/2007 | Chapman, Jr. et al. |
| 2007/0260782 A1 | 11/2007 | Shaikli |
| 2007/0278320 A1* | 12/2007 | Lunacek et al. ................ 236/94 |
| 2008/0003845 A1 | 1/2008 | Hong et al. |
| 2008/0013259 A1 | 1/2008 | Barton et al. |
| 2008/0029610 A1 | 2/2008 | Nichols |
| 2008/0048046 A1 | 2/2008 | Wagner et al. |
| 2008/0056722 A1 | 3/2008 | Hendrix et al. |
| 2008/0057872 A1 | 3/2008 | McFarland et al. |
| 2008/0057931 A1 | 3/2008 | Nass et al. |
| 2008/0058996 A1 | 3/2008 | Sachdev et al. |
| 2008/0082767 A1 | 4/2008 | Nulkar et al. |
| 2008/0083834 A1 | 4/2008 | Krebs et al. |
| 2008/0120335 A1 | 5/2008 | Dolgoff |
| 2008/0121729 A1 | 5/2008 | Gray |
| 2008/0129475 A1 | 6/2008 | Breed et al. |
| 2008/0144302 A1 | 6/2008 | Rosenblatt |
| 2008/0148098 A1 | 6/2008 | Chen |

| | | | | | |
|---|---|---|---|---|---|
| 2008/0161976 A1 | 7/2008 | Stanimirovic | 2010/0106325 A1 | 4/2010 | Grohman |
| 2008/0161978 A1 | 7/2008 | Shah | 2010/0106326 A1 | 4/2010 | Grohman |
| 2008/0168255 A1 | 7/2008 | Abou-Emara et al. | 2010/0106327 A1 | 4/2010 | Grohman et al. |
| 2008/0184059 A1 | 7/2008 | Chen | 2010/0106329 A1 | 4/2010 | Grohman |
| 2008/0192649 A1 | 8/2008 | Pyeon et al. | 2010/0106330 A1 | 4/2010 | Grohman |
| 2008/0192745 A1 | 8/2008 | Spears | 2010/0106333 A1 | 4/2010 | Grohman et al. |
| 2008/0195581 A1 | 8/2008 | Ashmore et al. | 2010/0106334 A1 | 4/2010 | Grohman et al. |
| 2008/0198036 A1 | 8/2008 | Songkakul et al. | 2010/0106787 A1 | 4/2010 | Grohman |
| 2008/0217419 A1 | 9/2008 | Ehlers et al. | 2010/0106809 A1 | 4/2010 | Grohman |
| 2008/0235611 A1 | 9/2008 | Fraley et al. | 2010/0106810 A1 | 4/2010 | Grohman |
| 2008/0272934 A1 | 11/2008 | Wang et al. | 2010/0106814 A1 | 4/2010 | Hadzidedic et al. |
| 2008/0281472 A1 | 11/2008 | Podgorny et al. | 2010/0106815 A1 | 4/2010 | Grohman et al. |
| 2009/0052105 A1 | 2/2009 | Soleimani et al. | 2010/0106925 A1 | 4/2010 | Grohman et al. |
| 2009/0057424 A1 | 3/2009 | Sullivan et al. | 2010/0106957 A1 | 4/2010 | Grohman et al. |
| 2009/0057425 A1 | 3/2009 | Sullivan et al. | 2010/0107007 A1 | 4/2010 | Grohman et al. |
| 2009/0062964 A1 | 3/2009 | Sullivan et al. | 2010/0107070 A1 | 4/2010 | Devineni et al. |
| 2009/0065597 A1 | 3/2009 | Garozzo et al. | 2010/0107071 A1 | 4/2010 | Pavlak et al. |
| 2009/0094506 A1 | 4/2009 | Lakkis | 2010/0107072 A1 | 4/2010 | Mirza et al. |
| 2009/0105846 A1 | 4/2009 | Hesse et al. | 2010/0107073 A1 | 4/2010 | Wallaert |
| 2009/0113037 A1 | 4/2009 | Pouchak | 2010/0107074 A1 | 4/2010 | Pavlak et al. |
| 2009/0119092 A1 | 5/2009 | Balasubramanyan | 2010/0107076 A1 | 4/2010 | Grohman |
| 2009/0132091 A1 | 5/2009 | Chambers et al. | 2010/0107083 A1 | 4/2010 | Grohman |
| 2009/0140056 A1 | 6/2009 | Leen | 2010/0107103 A1 | 4/2010 | Wallaert |
| 2009/0140057 A1 | 6/2009 | Leen | 2010/0107109 A1 | 4/2010 | Filbeck et al. |
| 2009/0140058 A1 | 6/2009 | Koster et al. | 2010/0107110 A1 | 4/2010 | Mirza |
| 2009/0140061 A1* | 6/2009 | Schultz et al. .................. 236/51 | 2010/0107111 A1 | 4/2010 | Mirza |
| 2009/0140062 A1 | 6/2009 | Amundson et al. | 2010/0107112 A1 | 4/2010 | Jennings et al. |
| 2009/0140063 A1 | 6/2009 | Koster et al. | 2010/0107232 A1 | 4/2010 | Grohman et al. |
| 2009/0140064 A1* | 6/2009 | Schultz et al. .................. 236/51 | 2010/0115364 A1 | 5/2010 | Grohman |
| 2009/0143879 A1 | 6/2009 | Amundson et al. | 2010/0131884 A1 | 5/2010 | Shah |
| 2009/0143880 A1 | 6/2009 | Amundson et al. | 2010/0142526 A1 | 6/2010 | Wong |
| 2009/0143916 A1* | 6/2009 | Boll et al. ..................... 700/276 | 2010/0145528 A1 | 6/2010 | Bergman et al. |
| 2009/0143918 A1* | 6/2009 | Amundson et al. .......... 700/278 | 2010/0145629 A1 | 6/2010 | Botich et al. |
| 2009/0157529 A1 | 6/2009 | Ehlers et al. | 2010/0168924 A1 | 7/2010 | Tessier et al. |
| 2009/0195349 A1 | 8/2009 | Frader-Thompson | 2010/0169419 A1 | 7/2010 | DeVilbiss et al. |
| 2009/0198810 A1 | 8/2009 | Bayer et al. | 2010/0179696 A1 | 7/2010 | Grohman et al. |
| 2009/0245278 A1 | 10/2009 | Kee | 2010/0211546 A1 | 8/2010 | Grohman et al. |
| 2009/0257431 A1 | 10/2009 | Ramanathan et al. | 2010/0241245 A1 | 9/2010 | Wiemeyer et al. |
| 2009/0259785 A1 | 10/2009 | Perry et al. | 2010/0259931 A1 | 10/2010 | Chemel et al. |
| 2009/0261767 A1 | 10/2009 | Butler et al. | 2010/0264846 A1 | 10/2010 | Chemel et al. |
| 2009/0266904 A1 | 10/2009 | Cohen | 2010/0270933 A1 | 10/2010 | Chemel et al. |
| 2009/0267540 A1 | 10/2009 | Chemel et al. | 2010/0272102 A1 | 10/2010 | Kobayashi |
| 2009/0271336 A1 | 10/2009 | Franks | 2010/0295474 A1 | 11/2010 | Chemel et al. |
| 2009/0287736 A1 | 11/2009 | Shike et al. | 2010/0295475 A1 | 11/2010 | Chemel et al. |
| 2010/0011437 A1 | 1/2010 | Courtney | 2010/0295482 A1 | 11/2010 | Chemel et al. |
| 2010/0023865 A1 | 1/2010 | Fulker et al. | 2010/0301768 A1 | 12/2010 | Chemel et al. |
| 2010/0050075 A1 | 2/2010 | Thorson et al. | 2010/0301769 A1 | 12/2010 | Chemel et al. |
| 2010/0050108 A1 | 2/2010 | Mirza | 2010/0301770 A1 | 12/2010 | Chemel et al. |
| 2010/0063644 A1 | 3/2010 | Kansal et al. | 2010/0301771 A1 | 12/2010 | Chemel et al. |
| 2010/0070086 A1 | 3/2010 | Harrod et al. | 2010/0301772 A1 | 12/2010 | Chemel et al. |
| 2010/0070089 A1* | 3/2010 | Harrod et al. .................. 700/277 | 2010/0301773 A1 | 12/2010 | Chemel et al. |
| 2010/0070093 A1 | 3/2010 | Harrod et al. | 2010/0301774 A1 | 12/2010 | Chemel et al. |
| 2010/0070907 A1 | 3/2010 | Harrod et al. | 2010/0305761 A1 | 12/2010 | Remsburg |
| 2010/0073159 A1 | 3/2010 | Schmickley et al. | 2010/0314458 A1 | 12/2010 | Votaw et al. |
| 2010/0076605 A1 | 3/2010 | Harrod et al. | 2010/0319362 A1 | 12/2010 | Hisaoka |
| 2010/0100253 A1 | 4/2010 | Fausak et al. | 2011/0001436 A1 | 1/2011 | Chemel et al. |
| 2010/0101854 A1 | 4/2010 | Wallaert et al. | 2011/0001438 A1 | 1/2011 | Chemel et al. |
| 2010/0102136 A1 | 4/2010 | Hadzidedic et al. | 2011/0004823 A1 | 1/2011 | Wallaert |
| 2010/0102948 A1 | 4/2010 | Grohman et al. | 2011/0004824 A1 | 1/2011 | Thorson et al. |
| 2010/0102973 A1 | 4/2010 | Grohman et al. | 2011/0007016 A1 | 1/2011 | Mirza et al. |
| 2010/0106305 A1 | 4/2010 | Pavlak et al. | 2011/0007017 A1 | 1/2011 | Wallaert |
| 2010/0106307 A1 | 4/2010 | Grohman et al. | 2011/0010620 A1 | 1/2011 | Mirza et al. |
| 2010/0106308 A1 | 4/2010 | Filbeck et al. | 2011/0010621 A1 | 1/2011 | Wallaert |
| 2010/0106309 A1 | 4/2010 | Grohman et al. | 2011/0010652 A1 | 1/2011 | Wallaert |
| 2010/0106310 A1 | 4/2010 | Grohman | 2011/0010653 A1 | 1/2011 | Wallaert et al. |
| 2010/0106311 A1 | 4/2010 | Wallaert | 2011/0010660 A1 | 1/2011 | Thorson et al. |
| 2010/0106312 A1 | 4/2010 | Grohman et al. | 2011/0032932 A2 | 2/2011 | Pyeon et al. |
| 2010/0106313 A1 | 4/2010 | Grohman et al. | 2011/0040785 A1 | 2/2011 | Steenberg et al. |
| 2010/0106314 A1 | 4/2010 | Grohman et al. | 2011/0061014 A1 | 3/2011 | Frader-Thompson et al. |
| 2010/0106315 A1 | 4/2010 | Grohman | 2011/0063126 A1 | 3/2011 | Kennedy et al. |
| 2010/0106316 A1 | 4/2010 | Curry et al. | 2011/0066297 A1 | 3/2011 | Saberi et al. |
| 2010/0106317 A1 | 4/2010 | Grohman et al. | 2011/0160915 A1 | 6/2011 | Bergman et al. |
| 2010/0106318 A1 | 4/2010 | Grohman et al. | 2011/0251726 A1 | 10/2011 | McNulty et al. |
| 2010/0106319 A1 | 4/2010 | Grohman et al. | 2012/0012662 A1 | 1/2012 | Leen et al. |
| 2010/0106320 A1 | 4/2010 | Grohman et al. | 2012/0046792 A1 | 2/2012 | Secor |
| 2010/0106321 A1 | 4/2010 | Hadzidedic | 2012/0065805 A1 | 3/2012 | Montalvo |
| 2010/0106322 A1 | 4/2010 | Grohman | 2012/0116593 A1 | 5/2012 | Amundson et al. |
| 2010/0106323 A1 | 4/2010 | Wallaert | 2012/0181010 A1 | 7/2012 | Schultz et al. |
| 2010/0106324 A1 | 4/2010 | Grohman | | | |

FOREIGN PATENT DOCUMENTS

| | | | |
|---|---|---|---|
| EP | 2241836 | A1 | 10/2010 |
| EP | 2241837 | A1 | 10/2010 |
| GB | 2117573 | A | 10/1983 |
| WO | 02056540 | A2 | 7/2002 |
| WO | 2008100641 | A1 | 8/2008 |

OTHER PUBLICATIONS

"Definition of Track by Macmillan Dictionary," http://www.macmillandictionary.com/dictionary/british/track, Mar. 12, 2013, 4 pages.

"Definition of track by the Free Online Dictionary, Thesaurus, and Encyclopedia," http://www.thefreedictionary.com/track, Mar. 12, 2013, 6 pages.

Checket-Hanks, B., "Zoning Controls for Convenience's Sakes, High-End Residential Controls Move Into New Areas," Air Conditioning, Heating & Refrigeration News, ABI/INFORM Global, Jun. 28, 2004, 3 pages.

Leeb, G., "A User Interface for Home-Net," IEEE Transactions on Consumer Electronics, vol. 40, Issue 4, Nov. 1994, pp. 897-902.

"IPMI—Intelligent Platform Management Interface Specification v1.5," Document Revision 1.1, Intel Hewlett-Packard NEC Dell, Feb. 20, 2002, 460 pages.

Nash, H., "Fire Alarm Systems for Health Care Facilities," IEEE Transactions on Industry Applications, vol. 1A-19, No. 5, Sep./Oct. 1983, pp. 848-852.

Fischer, H., et al., "Remote Building Management and DDc-Technology to Operate Distributed HVAC-Installations," The first International Telecommunications Energy Special Conference, TELESCON '94, Apr. 11-15, 1994, pp. 127-132.

Gallas, B., et al., "Embedded Pentium ®Processor System Design for Windows CE," WESCON 1998, pp. 114-123.

"iView-100 Series (iView/iView-100-40) Handheld Controller User's Manual," ICP DAS, Mar. 2006, Version 2.0.

"Spectre™ Commercial Zoning System, Engineering Data," Lennox, Bulletin No. 210366E, Oct. 2002, 33 pages.

Sharma, A., "Design of Wireless Sensors Network for Building Management Systems," University of California-Berkley, 57 pages.

"Linux Programmer's Manual," UNIX Man Pages: Login (1), http://unixhelp.ed.ac.uk/CGI/man-cgi?login, Util-linux 1.6, Nov. 4, 1996, 4 pages.

"Field Display for Tridium JACE Controllers Product Data," HVAC Concepts, Inc. 2005, 22 pages.

"HVAC Concepts," Jace Network-Installation, 2004, 2 pages.

Bruggeman, E., et al., "A Multifunction Home Control System," IEEE Transactions on Consumer Electronics, CE-29, Issue 1, Feb. 1983, 10 pages.

Sharma, A., "Design of Wireless Sensors Network for Building Management Systems," University of California-Berkley, 2003, 57 pages.

\* cited by examiner

PROGRAMMABLE CONTROLLER AND A USER INTERFACE FOR SAME

FIELD OF THE DISCLOSURE

The present disclosure relates generally to programmable controllers and, more particularly, to a user interface having an intuitive transition between indoor conditions and thermostat settings interfaces.

BACKGROUND

A programmable thermostat is a thermostat designed to adjust the temperature according to a series of programmed settings that take effect at different times of the day. In recent years, programmable thermostats have become increasingly popular as their use may result in energy savings of up to 30%. To do so, programmable thermostats reduce the amount of heating/cooling provided by the heating, ventilating and air conditioning (HVAC) system responsible for conditioning the air within a space. For example, during the cooling season, a programmable thermostat used in a home may be programmed to allow the temperature in the house to rise during the workday when no one will be at home but begin cooling the house prior to the arrival of the occupants, thereby allowing the house to be cooled down to the appropriate temperature setting upon the arrival of the occupants while having saved energy during the peak outdoor temperatures. Conversely, during the heating season, the programmable thermostat may be set to allow the temperature in the house to drop when the house is unoccupied during the day and also at night after all occupants have gone to bed and re-heating the house prior to the occupants arriving home in the evening or waking up in the morning.

A basic programmable thermostat implements a single program with two events (a warmer period and a colder period) that run every day. More sophisticated programmable thermostats allow four (or more) warm and/or cold periods, commonly referred to as "Wake", "Leave", "Return" and "Sleep" events to be set each day, each of which may be set to a unique temperature. Other programmable thermostats implement the same functions but are more versatile in that, rather than the single cycle that characterizes the more basic thermostats, they may include a "5-2" setting (which provides for separate weekday and weekend schedules), a "5-1-1" setting (which provides for separate Saturday and Sunday schedules or a "7 day" setting (which provides for a separate schedule for each day of the week. Further, while some programmable thermostats have separate heating and cooling programs, others employ a single program capable of selecting between the heating and cooling units. Still others include notification and/or alert functionality. For example, some programmable thermostats are capable of issuing notifications that the air filters need to be replaced. Moreover, programmable thermostats are expected to continue to increase in sophistication in future years.

As programmable thermostats have become more sophisticated, not only have the operators of programmable thermostats been expected to monitor or otherwise access increasingly greater numbers of thermostat settings, their ability to access selected thermostat settings are often impaired by the display of the increased number of thermostat settings available for programming. Those skilled in the art should appreciate, therefore, the need for programmable controllers that enables an operator to readily access selected thermostat settings. Accordingly, disclosed herein is such a programmable controller.

SUMMARY

In one embodiment, claimed herein is a programmable controller comprised of a touch screen and a processor subsystem coupled to the touch screen. The processor subsystem generates a first interface which displays a set of one or more conditions produced by operation of an HVAC system controlled by the programmable controller, either alone or in combination with one or more thermostat settings for the HVAC system. In response to a touch anywhere within the first interface, the processor subsystem generates a second interface from which the thermostat settings, including the thermostat settings displayed on the first interface, may be modified. In one aspect, the first interface may further include a control button for controlling a selected thermostat setting while the second interface may include controls for one or more thermostat settings not controllable at the first interface and, in further aspects thereof, the thermostat settings controllable at the first interface as well. In a still further aspect thereof, the first and second interfaces will both display indoor temperature, thermostat setpoint and operating mode and be capable of modifying the thermostat setpoint. However, only the second interface will be capable of modifying the operating mode.

In another embodiment, claimed herein is a user interface for a programmable controller. In accordance with this embodiment, the user interface includes a first interface having an area in which a value for a physical parameter is displayed and a second interface, generated in response to a touch of the first interface, having a first control button for selecting a conditioning process capable of modifying the value of the physical parameter. In one aspect thereof, a first thermostat setting is displayed in the area of the first interface and the second interface includes a second control button for modifying the thermostat setting. In another, the first interface includes a third control button, which may be located within a sub-area of the area of the first interface, for modifying the thermostat setting displayed in the area of the first interface. If the third control button is located within the sub-area of the first interface, the second interface is not generated in response to a touch of the sub-area of the first interface. In a preferred aspect of this embodiment, the area is a predominate portion of the first interface.

In still another embodiment, claimed herein is a user interface for a programmable thermostat. The user interface includes a default interface generated in response to an absence of operator inputs, a home screen which overlies a predominant portion of the default interface and an indoor settings interface which is generated in response to a touch of the home screen. The home screen includes a display of the current indoor temperature, the indoor temperature setpoint and the operating mode for an HVAC system controlled by the programmable thermostat while the indoor settings interface includes a first control for modifying the indoor temperature setpoint and a second control for selecting the operating mode for the HVAC system controlled by the programmable controller.

In addition to the indoor settings interface, in further aspects of this embodiment, the user interface further includes one or more tab interfaces and corresponding further settings interfaces. The tab interfaces are also generated in response to the touch of the home screen while a touch of a selected tab interface generates the corresponding further settings interface. The tab interfaces may include one or more of a weather tab, a programming tab, an indoor humidity tab, a zoning tab and an alert tab while the further settings interfaces may include one or more of a weather interface, a programming interface, an indoor humidity interface, a zoning interface and an alert interface. A home tab may also be generated in response to a touch of the home screen. Here, however, a touch of the home tab results in the generation of the home screen.

In various other aspects of this embodiment, the first control may be comprised of first and second buttons for respectively raising and lowering the indoor temperature setpoint in response to a touch thereof and the second control may be comprised of a button for selecting, in response to a touch thereof, the operating mode for the HVAC system controlled by the programmable controller. In further aspects thereof, both the home screen and the indoor settings interface include a control for modifying the indoor temperature setpoint while only the indoor settings interface includes a control for switching the operating mode between "heat only", "cool only", "heat & cool" and "off" settings. Importantly, in one aspect, the home screen is comprised of a first area and a second area configured such that the indoor conditions interface is generated in response to a touch of the first area of the home screen and the indoor temperature setpoint is modified in response to a touch of the second area of the home screen.

DESCRIPTION OF THE DRAWINGS

For a more complete understanding of the present invention, and for further details and advantages thereof, reference is now made to the drawings accompanying this disclosure, in which.

DETAILED DESCRIPTION

Figure 1:
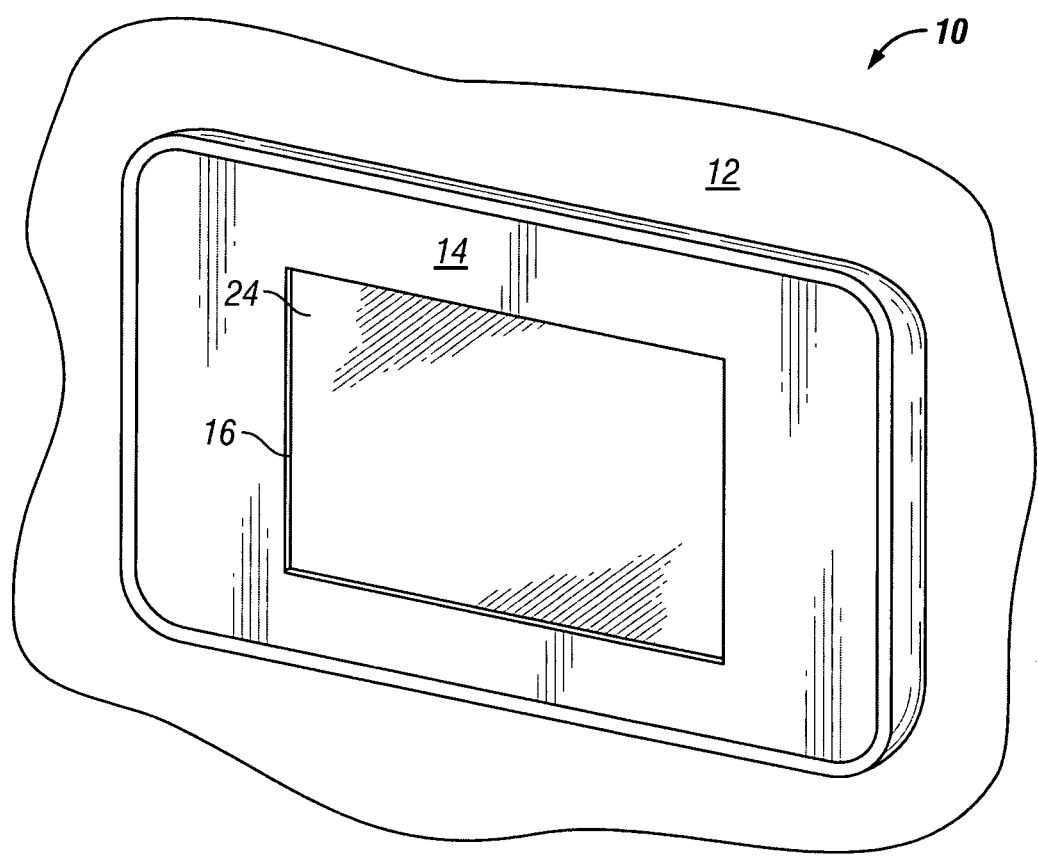
FIG. 1 is a perspective view of a programmable controller incorporating a user interface constructed in accordance with the teachings of the present disclosure.

The teachings set forth herein are susceptible to various modifications and alternative forms, specific embodiments of which are, by way of example, shown in the drawings and described in detail herein. It should be clearly understood, however, that the drawings and detailed description set forth herein are not intended to limit the disclosed teachings to the particular form disclosed. On the contrary, the intention is to cover all modifications, equivalents and alternatives falling within the spirit and scope of that which is defined by the claims appended hereto.

Referring first to FIG. 1, a programmable controller 10, for example, a programmable thermostat, mounted or otherwise attached to a vertically-oriented support structure 12, for example, an interior wall of a house, office building or other enclosed structure, the interior of which is to be thermally conditioned, e.g., heated or cooled, by an HVAC system (not shown in FIG. 1) controlled by the programmable controller 10, shall now be described. The programmable controller 10 includes a generally rectangular housing 14 formed from a thermoplastic or other type of hardened material. As disclosed herein, the housing 14 is comprised of a sub-base (not visible) flush or surface mounted to the wall 12 and an outer cover snap-mounted to the sub-base. An interior edge 16 of the housing 14 defines an opening through which a display screen 24, for example, a dynamic full color dot matrix LCD display having a touch pad built into/over the display, is visible. Preferably, the display screen 24, which hereafter shall be referred to as user interface 24, is a touch screen capable of detecting the presence and location of a touch anywhere on the user interface 24. It is contemplated, however, that a display capable only of detecting touches occurring at specified locations thereof may be suitable for use as the user interface 24. It should also be noted that, while the manner in which touch screens function may vary, generally, a processor subsystem (also not shown in FIG. 1) generates indicia, on the user interface 24, designating touch areas which, if depressed or otherwise contacted by the user, will issue a specified command to the processor subsystem.

Figure 2:
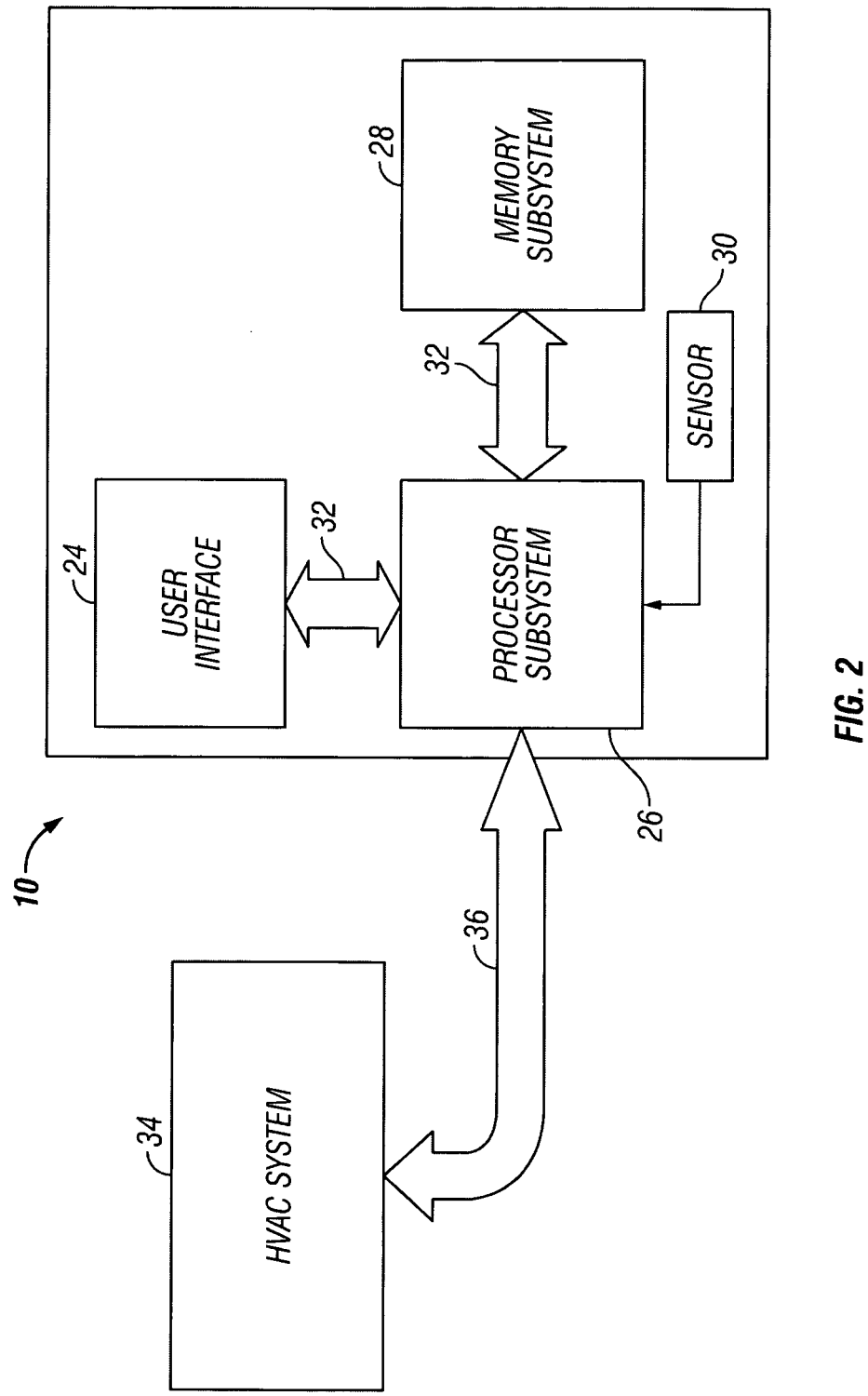
FIG. 2 is a block diagram of the programmable controller of FIG. 1 and an associated HVAC system.

Further details of the configuration of the programmable controller 10 may be seen by reference to FIG. 2. Of course, it should be clearly understood that FIG. 2 has been greatly simplified for ease of description and that numerous components thereof not deemed necessary for an understanding of the teachings set forth herein have been omitted from the drawing. As may now be seen, the programmable controller 10 is comprised of the user interface 24, a processor subsystem 26, a memory subsystem 28, a temperature sensor 30 and a bus subsystem 32. As used herein, the term "processor subsystem" encompasses the total processing capacity of the programmable thermostat 10, whether such processor capacity is embodied as a single processing device, for example, a microprocessor, residing in the programmable controller 10, multiple processing devices, for example, coprocessors, residing in the programmable controller 10, multiple processing devices residing in respective portions of the programmable controller 10 and interconnected with one another, or any combinations thereof. Similarly, the term "memory subsystem" encompasses the total memory capacity of the programmable controller 10, whether such memory capacity is embodied as main, auxiliary or other type of memory of a single computing device residing within the programmable controller 10, main, auxiliary or other type of memory of multiple computing devices residing within or the programmable controller 10 and interconnected with one another, main, auxiliary or other type of memory of multiple computing devices residing within respective portions of the programmable controller 10 and interconnected with one another, a stand-alone memory device, or any combinations thereof. Finally, the term "bus subsystem" encompasses all of the conductors and/or other types of connectors used to transfer address, data and control signals between the various electronic components and/or devices which collectively comprise the programmable controller 10.

In the embodiment illustrated in FIG. 2, the user interface 24, the processor subsystem 26 and the memory subsystem 28 are coupled together by the bus subsystem 32 for the exchange of address, data and control signals therebetween. As to the specific configuration of the bus subsystem 32, it should be noted that, while FIG. 2 suggests that discrete connections are employed to couple the user interface 24 and the memory subsystem 28, respectively, to the processor subsystem 26, e.g., a configuration similar to a system bus/local bus configuration, it is fully contemplated the user interface 24, the processor subsystem 26 and the memory subsystem 28 may all be coupled to a single bus, most commonly, a system bus. Further, in the embodiment illustrated in FIG. 2, the temperature sensor 30 is illustrated as being directly coupled to the processor subsystem 26. However, it is fully contemplated that the temperature sensor 30 may instead be coupled to the bus subsystem 32. Finally, while disclosed as a component of the programmable controller 10, it is further contemplated that the temperature sensor 30 may instead be a discrete device coupled to the processor subsystem 26/bus subsystem 32 of the programmable controller 10.

HVAC system 34 is coupled to the programmable controller 10 in a manner which enables the programmable controller 10 to turn on, turn off or otherwise control the HVAC system 34 and/or components thereof. For example, based upon data received from the temperature sensor 30 and information stored in the memory subsystem 28 and/or received from the user interface 24, the processor subsystem 26 may determine that an AC unit forming part of the HVAC system 34 should be turned on in order to cool the interior of the building in which the thermostat 10/HVAC system 34 is installed. The processor subsystem 26 will then issue a control signal instructing the AC unit to turn on via bus 36. Variously, the bus 36 may be coupled directly to the processor subsystem 26 as shown in FIG. 2 or indirectly coupled to the processor subsystem 26 via the bus subsystem 32.

The programmable controller 10 shall now be described in greater detail. The user interface 24 is configured to both provide information to the operator and issue commands to the processor subsystem 26. To perform these functions, the user interface 24 is actually comprised of multiple interfaces. As will be more fully described below, the various interfaces collectively forming the user interface 24 include a default interface, a home screen and any number of additional interfaces, including those interfaces periodically referred to as "tabbed interfaces." Each interface forming part of the user interface 24 enables the operator of the programmable thermostat 10 to acquire selected information and/or issue selected commands. One such interface, more specifically, default interface 37, may be seen by reference to FIG. 3.

The default interface 37 is generated by the processor subsystem 26 in the absence of detection, by the processor subsystem 26, of operator inputs. For example, if an interface, for example, a tabbed interface, other than the default interface 37 is displayed and a selected time period, for example, five minutes, expires with the processor subsystem 26 failing to detect a contact with a touch area of the displayed interface, any pending operations are terminated and the default interface 37 is generated in place of the displayed interface. Thus, as the controls of a programmable controller 10 are typically operated on an infrequent basis, the most common interface displayed by the programmable controller 10 will be the default interface 37. As may be seen in FIG. 3, the default interface 37 is comprised of a primary sub-interface 38a, hereafter referred to as "home screen 38a", and a secondary sub-interface 38b. Importantly, the home screen 38a covers a predominant portion of the surface area of the default interface 37 while the secondary sub-interface 38b covers a substantially lesser portion of the surface area of the default interface 37. In the embodiment illustrated in FIG. 3, the home screen 38a covers about 80% of the surface area of the default interface 37 while the secondary sub-interface 38b covers about 20% of the surface area of the default interface 37. However, it should be clearly understood that, as long as the home screen 38a covers a greater portion of the surface area of the default interface 37 when compared to the secondary sub-interface 38b, the precise ratio between the relative sizes of the home screen 38a and the secondary sub-interface 38b is unimportant.

The home screen 38a provides the operator of the programmable controller 10 with general information about the indoor conditions of the house or other structure being heated, cooled and/or otherwise treated by the HVAC system 34. As disclosed herein, the information available from a visual inspection of the home screen 38a includes both operating conditions and thermostat settings. It is fully contemplated, however, that the information available from a visual inspection of the home screen 38a may be limited to only one of the aforementioned types of information, e.g., the home screen 38a is limited to either a display of selected operating conditions or to a display of selected thermostat settings. In the embodiment illustrated in FIG. 3, by visually inspecting the home screen 38a, the operator of the programmable controller 10 is able to determine that (a) the current indoors is 70° F.; (b) the setpoint for the programmable controller 10 is 72° F.; (c) the programmable controller 10 has been programmed; and (d) the HVAC system 34 is currently heating and de-humidifying. Of the foregoing, the current temperature is a physical condition, the setpoint is a thermostat setting, the programming mode, e.g., programming is "on" or "off" is a thermostat setting and the operating mode for the HVAC system 34, e.g., system is "heating & cooling", "cooling only", "heating only" or "off" is also a thermostat setting.

In addition to the information generated on the home screen 38a by the processor subsystem 26, the home screen 38a includes touch areas 20, 21 and 22, all of which may be employed to generate commands for transmission to the processor subsystem 26. The touch areas 20, 21 and 22 are formed by (1) activating selected portions of the touch pad overlying/embedded in the display screen such that detection of a touch in the selected portions of the touch pad will be transmitted to the processor subsystem 26; (2) associating the detection of a touch in the selected portions of the touch pad to actions to be executed by the processor subsystem 26 and (3) generating icons or other type of visible indicia at, or in proximity to, the selected portions of the touch pad such that the operator will be ascertain the specific action to be performed in response to a touch in the selected portions of the user interface 24. To convey that a touch of the home screen 38a will initiate an action, the home screen 38a appears elevated relative to the remainder of the default interface 37 and at least one string of alphanumeric characters, for example, the character string stating "press for more," appears on the home screen 38a to suggest that additional information related to indoor conditions will be displayed in response to a touch of the home screen 38a. In contrast, the touch areas 21 and 22 each appear as a button, the button 21 including an "up arrow" icon which suggests that the setting proximate to the button 21, here, the thermostat setpoint, would be raised in response to a touch of the button 21 and the button 22 including a "down arrow" icon which suggests that the thermostat setpoint would be lowered in response to a touch of the button 22.

The secondary sub-interface 38b provides the operator with information as well, specifically, that the date is Sep. 31, 2008; and the current time is 23:45 hours (11:45 pm). In addition to the information generated thereon, the secondary sub-interface 38b includes touch areas 23 and 25, both of which may be employed to generate commands to be transmitted to the processor subsystem 26. The touch areas 23 and 25 are formed in a manner similar to that employed to form the touch areas 20, 21 and 22. Here, however, the touch area 23 appears as a button and includes an icon which suggests that important information related to the operation of the HVAC system 34 may be obtained by a touch of the button 23. The touch area 25, on the other hand, is masked from the operator by removing any visual indicia which suggests that information will be obtained by a touch of the touch area 25. The touch area is configured in this manner as it is intended only for use by a service technician during installation or repair of the programmable controller 10 and is not intended for use by the consumer. Furthermore, the touch area 25 requires an extended touch, for example, on the order of about 5 seconds, before the processor subsystem 26 will generate an installer interface associated with the touch area 25. As it is beyond the scope of the present disclosure, no further details regarding operation of the touch area 25 and/or the installer interface associated therewith is deemed necessary.

Figure 4:
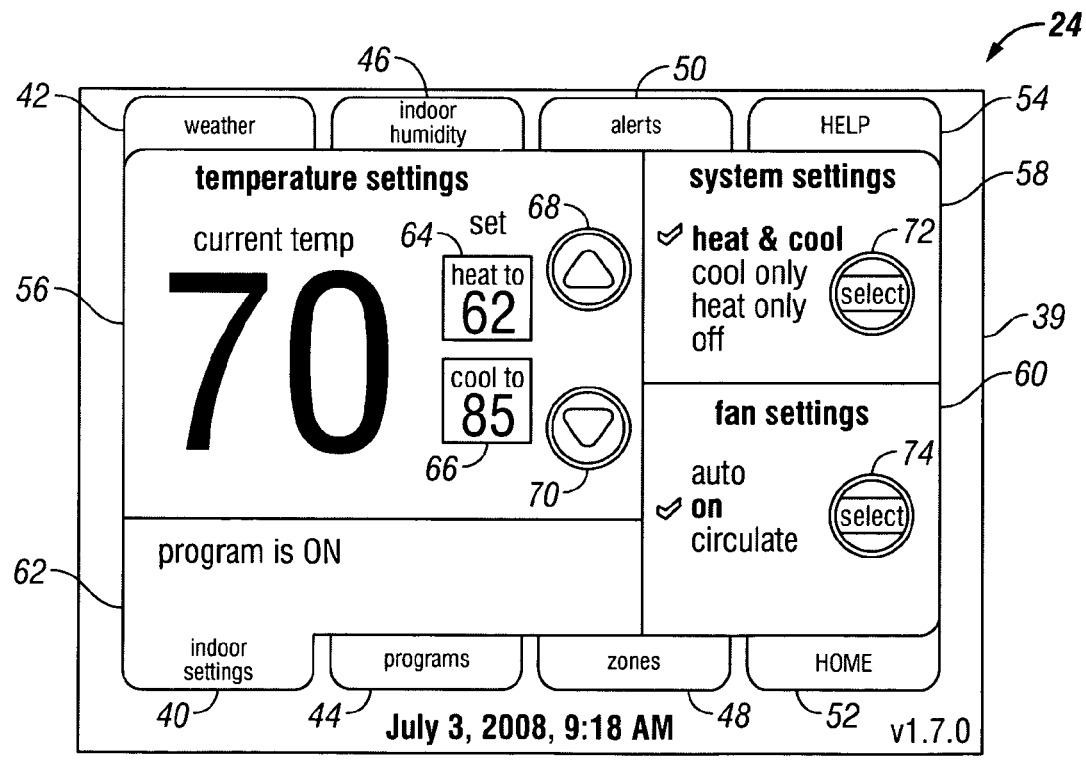
FIG. 4 is an illustration of an indoor settings interface associated with the home screen of FIG. 3.

Referring next to FIG. 4, upon detecting a touch of the home screen 38a, the processor subsystem 26 generates interface 39. As may now be seen, the interface 39 is comprised of a primary sub-interface 40, periodically referred to as either an "indoor settings interface" or, more specifically, a "tabbed indoor settings interface" 40, and a series of secondary sub-interfaces 42, 44, 46, 48, 50 and 52, each comprised of a touch area, which surround the periphery of the indoor settings interface 40. In the embodiment disclosed herein, each of the secondary sub-interfaces 42, 44, 46, 48, 50, 52 and 54 appear as a tab having an alphanumeric character string thereon, hence, the periodic usage of the term "tabbed indoor settings interface." For similar reasons, each of the secondary sub-interfaces 42, 44, 46, 48, 50, 52 and 54 are periodically referred to as either a "tab" or "tabbed" interface. Of course, it is fully contemplated that the particular size and shape of each of the secondary sub-interfaces 42, 44, 46, 48, 50, 42 and 54 may vary from one another and that they may be evenly or unevenly spaced around the indoor settings interface 40.

In the disclosed embodiment, the tab 42 has the character string "weather" appearing thereon to indicate that weather information will be displayed in response to a touch of the tab 42. The tab 44 has the character string "programs" appearing thereon to indicate that the settings used to program the programmable controller 10 will be displayed in response to a touch of the tab 44. The tab 46 has the character string "indoor humidity" appearing thereon to indicate that information related to indoor humidity will be displayed in response to a touch of the tab 46. The tab 48 has the character string "zones" appearing thereon to indicate that zoning information will be displayed in response to a touch of the tab 48. The tab 50 has the character string "alerts" appearing thereon to indicate that important information related to the operation of the HVAC system 34 will be displayed in response to a touch of the tab 50. The tab 52 has the character string "home" appearing thereon to indicate that the default interface 37, which includes the home screen 38a, will be generated in response to a touch of the tab 52. Finally, the tab 54 has the character string "help" appearing thereon to indicate that some form of assistance will be provided in response to a touch of the tab 54.

In response to a touch of a selected one of the weather tab interface 42, programs tab interface 44, indoor humidity tab interface 46, zones tab interface 48 or alerts tab interface 50, the interface 39 is modified, more specifically, a corresponding settings interface, e.g., a weather interface (which may include weather information and/or weather-related settings), a programming interface (which may include programming information and/or programming settings), an indoor humidity interface (which may include indoor humidity information and/or indoor humidity settings), a zoning interface (which may include zoning information and/or zone control settings) or an alert interface (which may include alert information and/or alert settings) replaces the indoor settings interface 40 and an indoor settings tab interface, similar in purpose and function to the tab interfaces 42, 44, 46 or 48 is generated. In contrast, in response to a touch of the home tab interface 52, the interface 39 is removed in favor of the default interface 37.

While, as disclosed herein, a touch of the home screen 38a causes the processor subsystem 26 to generate the indoor settings interface 40 and weather, programming, indoor humidity, zones, alerts, home and help tabs 42, 44, 46, 48, 50, 52 and 54, it should clearly be understood that, rather than being associated with the indoor settings interface 40, it is fully contemplated that the home screen 38a may instead be associated with any one of the other interfaces, e.g., weather, programming, indoor humidity, zones or alerts interfaces described herein as being accessible by touching the corresponding weather, programming, indoor humidity, zones or alerts tab 42, 44, 46, 48 or 50. If such an association is established, the selected one of the weather, programming, indoor humidity, zones and alert interfaces, an indoor settings tab and tabs for the unselected interfaces would be generated in response to a touch of the home screen 38a. It is further contemplated that, rather than the conditions and thermostat settings described herein as being displayed on the home screen 38a, the home screen 38a may instead display conditions and/or thermostat settings related to the particular interface associated therewith.

The indoor settings interface 40 is divided into four sub-interfaces-temperature conditions and settings sub-interface 56, system mode settings sub-interface 58, fan mode settings sub-interface 60 and programming mode setting sub-interface 62. Visual inspection of the temperature conditions and settings sub-interface 56 allows the operator to determine the current indoor temperature (70° F.), the setpoint for heating operations (62° F.) and the setpoint for cooling operations (85° F.). Additionally, the user is able to raise or lower the heating set point and/or the cooling set point by touching button 64 (to select the setpoint for heating operations) or button 66 (to select the setpoint for cooling operations) and then touching button 68 to raise the selected setpoint or touching button 70 to lower the selected setpoint.

Visual inspection of the system settings sub-interface 58 enables the operator to determine whether the programmable controller 10 has been set to the "heat & cool" setting in which the programmable controller 10 would conduct both heating and cooling operations using the HVAC equipment 34, the "cool only" setting in which the programmable controller 10 would conduct cooling, but not heating, operations using the HVAC equipment 34, the "heat only" setting in which the programmable controller 10 would conduct heating, but not cooling, operations using the HVAC equipment 34 and the "off" setting in which the programmable controller 10 would conduct neither heating nor cooling operations using the HVAC equipment 34. Of course, the foregoing system settings are provided purely by way of example and it is fully contemplated that other system settings, for example, an "emergency heat" setting, may be displayed in the system settings area 58. Additionally, by touching button 72 one or more times, the operator can toggle between the "heat & cool", "cool only", "heat only" and "off" settings.

Visual inspection of the fan settings area 60 enables the operator to determine whether the fan has been set to the "auto" setting in which the programmable controller 10 would instruct a blower fan component of the HVAC system 34 to only run when heating or cooling operations are ongoing, the "on" setting in which the programmable controller 10 would instruct the blower fan to run continuously or the "circulate" setting in which the programmable controller 10 would instruct the blower fan to run while heating or cooling operations are ongoing and for a preselected portion of inactive periods, e.g., those periods when neither heating nor cooling operations are being conducted. As before, it is fully contemplated that the foregoing settings are provided purely by way of example and that any number of other fan settings may be displayed in the fan settings area 60. Additionally, by touching button 74 one or more times, the operator can toggle between the "auto", "on" and "circulate" settings.

Finally, visual inspection of the programming mode subinterface 62 enables the operator to determine whether or not the programmable controller 10 has been programmed, e.g., is in the "on" setting or the "off" setting. In one example, the programmable controller 10 is programmed by selecting "awake", "leave", "return" and "sleep" times for each day of the week and heating and cooling setpoints for each selected time for each day of the week. Of course, the foregoing is but one of many examples describing when the programming mode is on.

While a specific configuration of the indoor settings interface 40 has been described, it should be clearly understood that the configuration of the indoor settings interface 40 disclosed herein is purely exemplary and that the information obtained by the visual inspection thereof may be displayed in a wide variety of configurations. It is further contemplated that an equally wide variety of techniques may be employed to vary the settings illustrated in the indoor settings interface 40. Moreover, it should be understood that the information that is available from inspection of the indoor settings interface 40 and/or the settings that may be modified from the indoor settings interface 40 are also exemplary and it is fully contemplated that the indoor settings interface 40 may include additional types of information not specifically described herein and/or may not include one or more of the types of information identified herein. Further, it is contemplated that, in alternate embodiments thereof, one or more of the settings described as being modifiable from the indoor settings interface 40 may not be and that one or more additional settings not specified herein may be modifiable from the indoor settings interface 40. Finally, it should be understood that but a single example as to how the indoor settings interface 40 may be modified to reflect changes to the settings of the programmable controller 10 has been disclosed herein and it is fully contemplated that changes to the settings of the programmable controller 10 may be reflected by any number of types of modifications to the indoor settings interface 40 other than that specifically described and illustrated herein.

Figure 3:
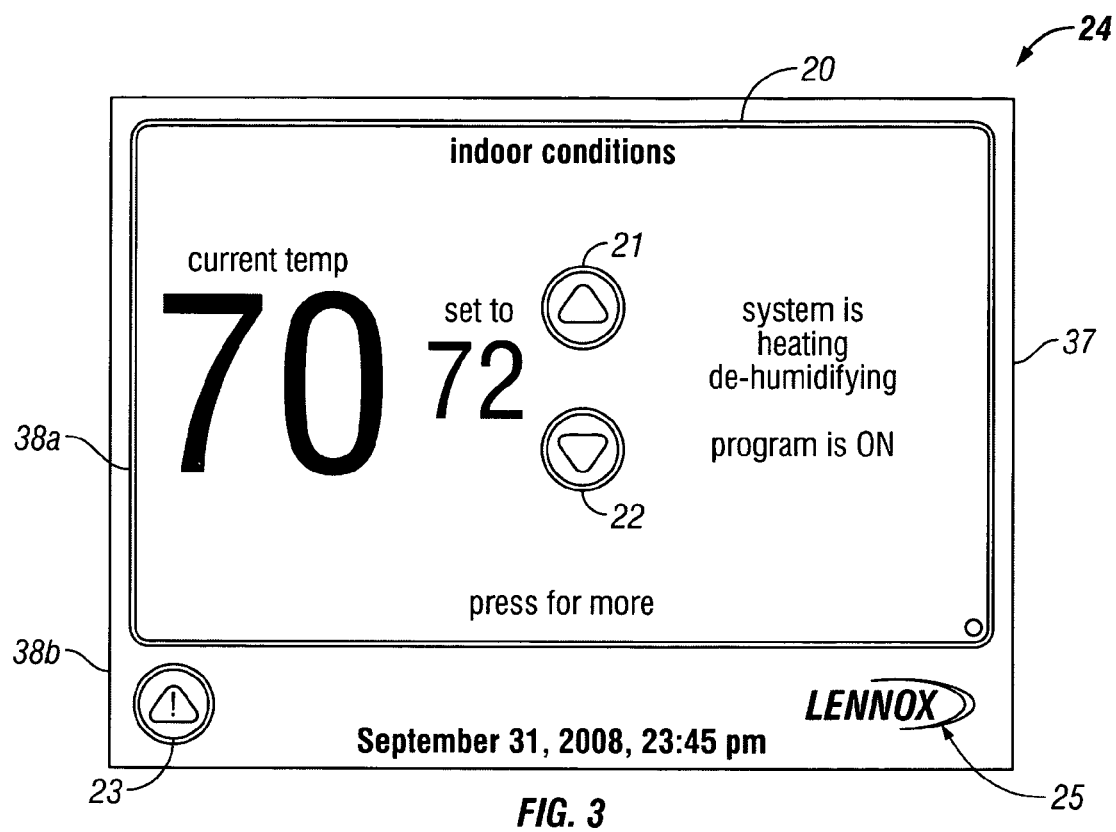
FIG. 3 is an illustration of a default interface for the programmable controller of FIGS. 1-2 and a home screen covering a predominant portion of the default interface.

As may be readily discerned from the preceding description, the home screen 38a has been associated with the indoor settings interface 40, e.g., the indoor settings interface 40 is generated by touching the home screen 38a. Referring now in combination to FIGS. 3 and 4, various advantageous features resulting from the foregoing association will now be described in detail. More specifically, an inspection of the home screen 38a enables the operator to learn significant details regarding both the indoor conditions produced by operation of the HVAC system 34 and the settings for the programmable controller 10 causing the indoor conditions. However, while the home screen 38a is informative, a lesser number of the thermostat settings displayed on the home screen 38a may be modified or otherwise controlled from the home screen 38a. Accordingly, to enable the operator to intuitively transition, without significant delay, to an interface where a greater number of the thermostat settings displayed on the home screen 38a, as well as additional thermostat settings capable of affecting indoor conditions, may be modified or otherwise controlled, the home screen 38a is associated with the indoor settings interface 40 such that a touch of the home screen 38a generates the indoor settings interface 40.

As a result, even with less than complete familiarity with the programmable controller 10, an operator is capable of readily ascertaining the process by which the programmable controller 10 transitions from an interface which primarily serves as a display of operating conditions and thermostat settings to an interface from which the thermostat settings may be modified. Features of the home screen 38a which provide an intuitive understanding of the association of the home screen 38a with the indoor settings interface 40 include, among others, the manner in which (a) the home screen 38a predominates the default interface 37; (b) the entirety of the home screen 38a appears elevated relative to the default interface, thereby suggesting that the home screen 38a constitutes a single touch area; (c) the inclusion of character strings, for example, the character strings "indoor conditions" and "press for more", indicating both an association between the home screen 38a and the indoor settings interface 40 and that the indoor settings interface 40 will be generated in response to a touch of the home screen 38a.

The home screen 38a also provides a simplified interface which enables the operator to modify selected thermostat settings without having to generate the indoor settings interface 40. As previously set forth, the home screen 38a includes first and second buttons 21 and 22 which enable the operator to modify the system setpoint from the home screen 38a. To do so, the home screen 38a is comprised of first and second areas, the first of which encompasses the first and second buttons 21 and 22 and the second of which covers the remainder of the home screen 38a. Further, the home screen 38a is configured such that the system setpoint is modified in response to a touch of the first area of the home screen 38a and the indoor settings interface is generated in response to a touch of the second area of the home screen 38a.

Finally, the default interface is configured such that it provides a separate path to the alerts interface hereinabove indicated as being generated in response to a touch of the alerts tab 50. More specifically, by associating the button 23 with the alerts interface, the alerts interface is generate in response to the detection of a touch of the button 23 of the secondary sub-interface 38b.

The teachings set forth herein are susceptible to various modifications and alternative forms, specific embodiments of which are, by way of example, shown in the drawings and described in detail herein. It should be clearly understood, however, that the drawings and detailed description set forth herein are not intended to limit the disclosed teachings to the particular form disclosed. On the contrary, the intention is to cover all modifications, equivalents and alternatives falling within the spirit and scope of that which is defined by the claims appended hereto.

The invention claimed is:

1. A programmable controller for controlling an HVAC system, comprising:
   a touch screen; and
   a processor subsystem coupled to said touch screen;
   said processor subsystem configured: 1) to generate a first interface that a) includes primary and secondary subinterfaces that together utilize substantially all of an available display area of said touch screen, and b) displays a set of one or more physical conditions produced by operation of said HVAC system and, 2) to generate, in response to a touch of said primary subinterface a second interface from which one or more thermostat settings for said HVAC system may be modified, and, 3) to generate, in response to a touch of said secondary subinterface a third interface from which one or more settings for said HVAC system may be modified,
   wherein an area of said primary subinterface configured to generate said second interface comprises an entirety of said primary subinterface with the exception of one or more displayed control buttons contained within said primary subinterface and configured to change one of said thermostat settings.

2. The programmable controller of claim 1, wherein a first thermostat setting for said HVAC system is displayed on, and modifiable from, said second interface.

3. The programmable controller of claim 2, wherein both said first interface and said second interface display a second thermostat setting for said HVAC system, said second thermostat setting being modifiable from said second interface.

4. The programmable controller of claim 1, wherein a first physical condition is displayed on both said first interface and said second interface.

5. The programmable controller of claim 1, wherein current indoor temperature is displayed on both said first interface and said second interface, a first thermostat setting is operating mode and a second thermostat setting is temperature setpoint.

6. The programmable controller of claim 1, wherein said primary subinterface is coextensive with a predominant portion of said first interface that is less than an entirety of said first interface, and said secondary subinterface is coextensive with a remaining portion of said first interface.

7. The programmable controller of claim 1, wherein said processor subsystem is further configured to generate said response to a touch of said primary subinterface for a first duration, and to generate said response to a touch of said secondary subinterface for a different second duration.

8. A user interface for a programmable HVAC system controller, comprising:
   a first interface having primary and secondary subinterfaces that together utilize substantially all of an available display area, said primary subinterface having an area in which a value for a physical parameter is displayed; and
   a second interface having a first control button for selecting a conditioning process capable of modifying said value of said physical parameter; wherein
   said second interface is generated in response to a touch of said primary subinterface; and a third interface is generated in response to a touch of said secondary subinterface,
   wherein an area of said primary subinterface configured to generate said second interface comprises an entirety of said primary subinterface with the exception of a second control button contained within said primary subinterface and configured to change one of said one or more thermostat settings of said HVAC system.

9. The user interface of claim 8, wherein a first thermostat setting is displayed in said primary subinterface and said second interface includes a third control button for modifying one of said one or more thermostat settings.

10. The user interface of claim 9, wherein said first interface includes a fourth control button for modifying said one of said one or more thermostat settings.

11. The user interface of claim 8, wherein said primary subinterface is coextensive with a predominant portion of said first interface that is less than an entirety of said first interface, and said secondary subinterface is coextensive with a remaining portion of said first interface.

12. The user interface of claim 8, wherein said processor subsystem is further configured to generate said response to a touch of said primary subinterface for a first duration, and to generate said response to a touch of said secondary subinterface for a different second duration.

13. A user interface for a programmable controller for controlling an HVAC system, the user interface comprising:
   a default interface, said default interface including primary and secondary subinterfaces that together utilize substantially all of an available display area, and being generated in response to an absence of operator inputs;
   a home screen, said home screen being coextensive with said primary subinterface, said home screen displaying a current indoor temperature, an indoor temperature setpoint and an operating mode; and
   an indoor settings interface, said indoor settings interface having a first control for modifying said indoor temperature setpoint and a second control for selecting said operating mode;
   wherein said indoor settings interface is generated in response to a touch of said home screen, and an installer interface is generated in response to a touch of said secondary subinterface
   wherein an area of said home screen configured to generate said indoor settings interface comprises an entirety of said primary subinterface with the exception of one or more displayed control buttons entirely contained within said home screen and configured to change said indoor temperature setpoint.

14. The user interface of claim 13, and further comprising:
   at least one tab interface; and
   at least one further settings interface, each of said further settings interface associated with a corresponding one of said at least one tab interface;
   wherein in response to a touch of a selected one of said at least one tab interface, a further settings interface associated with said selected tab interface is generated.

15. The user interface of claim 14, wherein:
   said at least one tab interface includes one or more of a weather tab, a programming tab, an indoor humidity tab, a zoning tab and an alert tab; and wherein:
   said at least one further settings interface includes one or more of a weather interface, a programming interface, an indoor humidity interface, a zoning interface and an alert interface.

16. The user interface of claim 15, and further comprising:
   a home tab;
   wherein said home tab is generated in response to a touch of said home screen; and
   wherein said home screen is generated in response to a touch of said home tab.

17. The user interface of claim 13, wherein said first control comprises a first control button for raising said indoor temperature setpoint in response to a touch thereof and a second control button for lowering said indoor temperature setpoint in response to a touch thereof.

18. The user interface of claim 13, wherein said second control comprises a control button for selecting said operating mode in response to a touch thereof.

19. The user interface of claim 18, wherein, by touching said control button, said operating mode may be switched between "heat only", "cool only", "heat & cool" and "off" settings.

20. The user interface of claim 13, wherein said primary subinterface is coextensive with a predominant portion of said first interface that is less than an entirety of said first interface, and said secondary subinterface is coextensive with a remaining portion of said first interface.

21. The user interface of claim 13, wherein said processor subsystem is further configured to generate said response to a touch of said primary subinterface for a first duration, and to generate said response to a touch of said secondary subinterface for a different second duration.

* * * * *